Oct. 15, 1957   A. W. CIAVOLA   2,809,552
CONSTANT DENSITY MULTIPLE COLOR PLATE
Filed Oct. 25, 1955

INVENTOR.
ALEXANDER W. CIAVOLA
BY
Harry M. Saragovitz
ATTORNEY

2,809,552

CONSTANT DENSITY MULTIPLE COLOR PLATE

Alexander William Ciavola, Detroit, Mich.

Application October 25, 1955, Serial No. 542,794

6 Claims. (Cl. 88—14)

(Granted under Title 35, U. S. Code (1952), sec. 266)

This invention relates to color photography, more particularly to a method and system for determining color corrections.

This application is a continuation-in-part of my co-pending application Serial No. 267,146, filed January 3, 1952, entitled, "Constant Density Multiple Color Plate," now abandoned.

The human eye is sensitive to differences in color, such as red, green or blue, but where a combination of primary colors is considered, the eye must rely on the comparison method to determine degrees of orange, purple, etc. Furthermore, the eye can distinguish that one shade of red, for example, is deeper than another red, but it cannot accurately measure the degree of color saturation present in a given color material as compared to measurements with a vacuum tube photocell and micro-ammeter.

Due to what are known as psycho-physical characteristics, the following human deficiencies in color perception are understood to exist:

(1) Inability to distinguish certain hues of color except by the comparison method;

(2) Inability to measure the degree of saturation of a given color, and (3) Inability to recognize and measure variable intensities of light by which a color is viewed.

Notwithstanding these great deficiencies, the human system has one important characteristic which cannot be matched by a purely automatic device, that is, the psychic ability to select the proper color correction to produce the most pleasing color balance for any given transparency. If every color transparency contained a gray scale, then, of course, an automatic color densitometer could be constructed to give measurements which could be utilized to produce consistently accurate color corrections for any number of transparencies. But since each transparency does not contain a gray scale, and in many cases does not even contain a neutral gray or white area, it is not possible to calibrate an instrument for consistent measurements, because of the infinite number of color variations.

Realizing these limitations, prior art methods of determining color corrections have included the making of preliminary test strips. The number of test strips required varies as a function of the skill of the operator, and in any event the making of test strips is a costly and time-consuming procedure. Attempts have been made to make color corrections by merely viewing the color transparency to be printed through a sequence of correction filters, but such methods of color correction also have proved to be time-consuming and incapable of consistent results. We must therefore revert to the human system for versatile control of the innumerable variations, but in order to obtain accurate color corrections, the human system must be supplemented with a device which will compensate for the human deficiencies mentioned above. This instrument must perform the following functions:

(1) It must contain all of the commercially standardized filter colors and hues in a convenient pattern to allow comparison of colors by the visual method.

(2) It must have controlled intensity of light to equalize the illumination of colors and yet allow for normal loss of light due to color saturation.

(3) It must provide for easy identification of the proper color correction filter.

With such a system, the human eye will observe all of the possible colors for comparison under illumination which compensates for the loss of light due to increased neutral density of the more heavily saturated color filters. Thus, when viewing two colors side by side it is possible to compare correctly their true intensity and value. This is accomplished by viewing the transparency through a specially designed multiple color plate constructed and illuminated in such a manner that it has a uniform amount of visible light at the surface of the plate over which the transparency is viewed. A practical embodiment incorporating this principle includes a constant density multiple color plate used over a standard light housing.

Accordingly, it is an object of the present invention to provide a novel method and apparatus for determining color corrections.

A further object of the invention is to provide a method and system which will produce consistently accurate color corrections without requiring a highly skilled operator.

Another object of the invention is to provide a novel correction method and system utilizing the comparison method.

An additional object of the invention is to provide a method and apparatus for determining the proper color correction filters necessary to produce a well-balanced color print without the use of preliminary test strips.

These and other objects of the invention will more fully appear from consideration of the following description of the invention when taken in conjunction with the accompanying drawing wherein.

Figure 1:
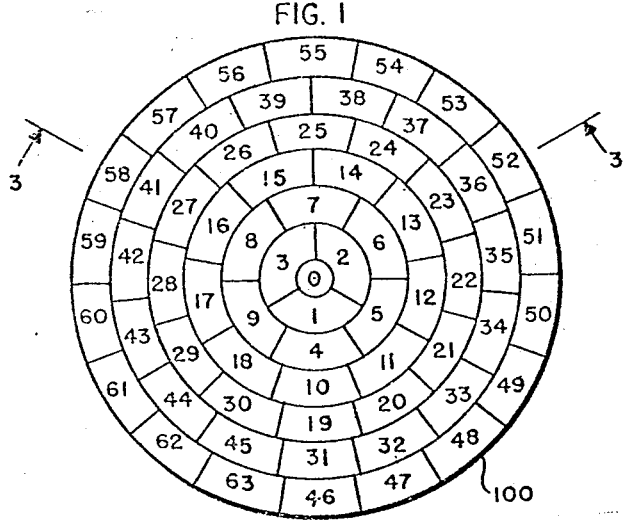
Fig. 1 is a plan view of one form of a constant density multiple color plate having a circular shape.
Figure 2:
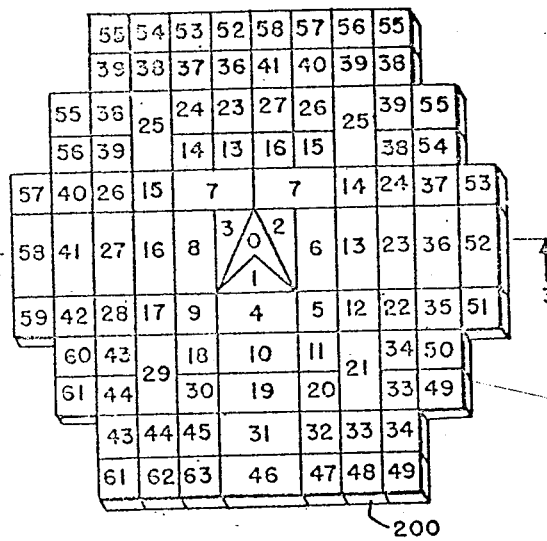
Fig. 2 is a plan view of a second modification of the constant density multiple color plate having a square shape.

Referring now more specifically to Figs. 1 and 2, the color filters are preferably arranged in a pattern so that there are radiating columns of colors with the heaviest color saturation on the outer edge of the plate and progressively lighter colors toward the center with the lightest color filters at the center of the plate. The order could be reversed if desired. The shape of the plate is not critical and may be circular as shown in Fig. 1, square as shown in Fig. 2, or triangular. It may have any other desired configurations, the convenience and efficiency of use being the primary factor to be considered in choosing the shape.

The coloring material of the filter sections may be inorganic or organic dye pigments embodied in a glass sheet, a glass sheet being more satisfactory than a gelatin sheet for this purpose. The gelatin sheet filters however, are commercially available and are supplied in three colors, yellow, magenta and cyan and in several color densities or saturations for each color or hue.

Figure 3:
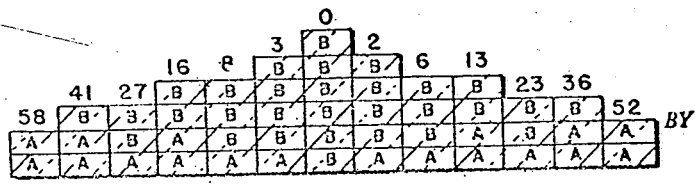
Fig. 3 is a cross sectional view along section line 3—3 of either Fig. 1 or Fig. 2 though at different scale, illustrating the addition of neutral density filters to the color filters to equalize the neutral density of each filter section.

Figure 3 is a sectional view of either Fig. 1 or Fig. 2 along line 3—3 illustrating one method of constructing the constant density multiple color plate which comprises color filters A used alone or in combination with one another and/or with neutral density filters B. It may be noted that more neutral density filters are used in the areas having less color saturation or color density; the number and location of neutral density filters shown in the drawing are merely illustrative of the general pattern and are not equal to the number as indicated in the table below. The filters may be held together in any desired manner and sandwiched between two transparent plates.

Thus far there has been described a pattern of colors consisting of the various combinations of cyan, magenta and yellow colors with the lightest color saturations in the center and the heaviest color saturations on the outer edge. If a color transparency is placed on the center of this color plate and various portions of the transparency are viewed with the illuminated color plate as a background, it is possible to see immediately the effect of each of the three basic colors on the color balance of the transparency. For example, if there is an excess of magenta in the color transparency, it is necessary to determine which combination of the other primary colors will remove the excess of magenta in order to make a well balanced color print. In this case the magenta filter sections would reinforce the magenta excess and make the over-all transparency seem deeper red, whereas the cyan and yellow areas would show a distinct improvement due to the subtraction of red and addition of cyan or yellow or both. Whichever color tends to remove the excess of magenta without producing an excess of its own color is the proper filter or filter combination to be used for color correction of the specific transparency. Consequently, the more color correction necessary, the farther the operator must move the transparency toward the outer areas of the color plate.

An important characteristic of color filters is that as the filters increase in color density or color saturation, these filters also increase in equivalent neutral density and consequently have a decrease in light transmission. For example, filters having least color saturations such as magenta 33 as referred to in the following table have an equivalent neutral density of 5 or light transmission characteristics of 95 while filters having heavier color saturations, such as magenta 35 have an equivalent neutral density of 14 or light transmission characteristic of 75. The value of the neutral density equivalent and the light transmission characteristic are generally inversely proportional to each other, though not in a linear manner. The neutral density equivalent values of commercially made gelatin color filters are available from the manufacturer as are the light transmission characteristics though the latter may be determined approximately by a photocell and meter.

Now if a color correction were determined using only color filters without the neutral density correction filters, the operator would observe a correction which would not be accurate because of the loss of light caused by the decreased light transmission characteristics or increased equivalent neutral density of the more heavily saturated color filters. The eye interprets this loss of light as a heavier color saturation, but a photographic film or print records the actual color saturation which results in the selection of a color filter section which has less color saturation than is actually needed to provide a proper color balance for a print.

Therefore, in order to make an accurate color correction visually on a color transparency it is necessary to view the color transparency on a background of varied colors with the light transmission characteristic or neutral density of the sections of the color plate adjusted to be equal and constant, assuming each color section is equally illuminated. This is accomplished by inserting neutral density filters on top of the color filter combinations in such a way that the amount of light passing through all sections on the color filter plate will be the same when measured by a photocell. The effective neutral density may be controlled by using either glass or gelatin neutral filters or by adjusting the thickness of the color filters so that the lighter color filters would be thicker than the heavier ones.

Figs. 1–3 of the drawing illustrate preferred embodiments of the color plate, designated by the reference character 100 and 200 respectively. The color correction filters 1–63 are arranged according to the invention as set forth above. The chart below gives the construction data for each of the filters. In this chart, the first column designates numbers of the filters of Figs. 1–3; the second column gives the color designation of the filters according to conventional commercial practice, Y representing yellow, R representing red or magenta, and B representing blue, green or cyan; the third column gives a light transmission factor representing a measure of the light as registered by a photocell and meter which is transmitted by the uncompensated filter sections, the reading of 100 being based on the light present at the surface of the plate with no filter section inserted; and the fourth column represents the necessary density correction factor in terms of the number of neutral density filters necessary to be added to each filter section to make the equivalent neutral density of each section equal.

*Combination filter value—density+correction chart*

| No. | Filter Values | Light Transmission Factor | Correction Factor |
| --- | --- | --- | --- |
| 1 | B-43 | 95 | +12 |
| 2 | R-33 | 95 | +12 |
| 3 | Y-23 | 100 | +13 |
| 4 | B-44 | 85 | +10 |
| 5 | B-43, R-33 | 80 | +9 |
| 6 | R-34 | 85 | +10 |
| 7 | R-33, Y-23 | 85 | +10 |
| 8 | Y-24 | 95 | +12 |
| 9 | Y-23, B-43 | 85 | +10 |
| 10 | B-43, B-44 | 70 | +7 |
| 11 | B-44, R-33 | 70 | +7 |
| 12 | B-43, R-34 | 65 | +6 |
| 13 | R-33, R-34 | 70 | +7 |
| 14 | R-34, Y-23 | 70 | +7 |
| 15 | R-33, Y-24 | 75 | +8 |
| 16 | Y-23, Y-24 | 80 | +9 |
| 17 | Y-24, B-43 | 75 | +8 |
| 18 | Y-23, B-43, B-44 | 75 | +8 |
| 19 | B-45 | 75 | +8 |
| 20 | B-43, B-44, R-33 | 60 | +5 |
| 21 | R-34, B-44 | 55 | +4 |
| 22 | R-33, R-34, B-43 | 55 | +4 |
| 23 | R-35 | 55 | +4 |
| 24 | R-33, R-34, Y-23 | 60 | +5 |
| 25 | R-34, Y-24 | 60 | +5 |
| 26 | R-33, Y-23, Y-24 | 65 | +6 |
| 27 | Y-25 | 65 | +6 |
| 28 | Y-23, Y-24, B-43 | 75 | +8 |
| 29 | Y-24, B-44 | 65 | +6 |
| 30 | Y-23, B-43, B-44 | 60 | +5 |
| 31 | B-45, B-43 | 50 | +3 |

*Combination filter value—density+correction chart*—Continued

| No. | Filter Values | Light Transmission Factor | Correction Factor |
|---|---|---|---|
| 32 | B-45, R-33 | 50 | +3 |
| 33 | B-43, B-44, R-34 | 45 | +2 |
| 34 | R-33, R-34, B-44 | 45 | +2 |
| 35 | R-35, B-43 | 50 | +3 |
| 36 | R-33, R-35 | 50 | +3 |
| 37 | R-35, Y-23 | 50 | +3 |
| 38 | R-33, R-34, Y-24 | 50 | +3 |
| 39 | R-34, Y-23, Y-24 | 55 | +4 |
| 40 | Y-25, R-33 | 60 | +5 |
| 41 | Y-23, Y-25 | 65 | +6 |
| 42 | Y-25, B-43 | 60 | +5 |
| 43 | Y-23, Y-24, B-43 | 55 | +4 |
| 44 | Y-24, B-43, B-44 | 50 | +3 |
| 45 | Y-23, B-45 | 55 | +4 |
| 46 | B-44, B-45 | 35 | 0 |
| 47 | B-43, B-45, R-33 | 35 | 0 |
| 48 | B-45, R-34 | 35 | 0 |
| 49 | B-43, B-44, R-33 | 35 | 0 |
| 50 | R-34, B-44, R-35 | 35 | 0 |
| 51 | B-43, R-33, R-35 | 40 | +1 |
| 52 | R-34, R-35 | 40 | +1 |
| 53 | R-33, R-35, Y-23 | 40 | +1 |
| 54 | R-35, Y-24 | 45 | +2 |
| 55 | R-33, R-34, Y-23, Y-24 | 40 | +1 |
| 56 | Y-25, R-34 | 45 | +2 |
| 57 | R-33, Y-23, Y-25 | 50 | +3 |
| 58 | Y-24, Y-25 | 50 | +3 |
| 59 | Y-23, Y-25, B-43 | 40 | +1 |
| 60 | B-44, Y-25 | 45 | +2 |
| 61 | B-43, B-44, Y-23, Y-24 | 40 | +1 |
| 62 | B-45, Y-24 | 40 | +1 |
| 63 | B-43, B-45, Y-23 | 40 | +1 |

In this table it is noted that sections 46–50 have the smallest light transmission factor and consequently the greatest effective neutral density. One convenient method to practice this invention is to equalize the effective neutral density of all of the filter sections to a light transmission factor of 35 since that is the lowest light transmission factor of any of the filter sections being used. Since a commercial neutral density filter has a light transmission factor of 5, the desired compensation for each color filter section will be realized by basing the number of such neutral density filters to be added to each section on the light transmission factor of the color filters used in each section. Thus for filter No. 2 which has a light transmission factor of 95, twelve such neutral density filters must be employed to reduce the light transmission factor to 35 (95−[12×5]=35). Similarly section 0 which has no color filter and hence a light transmission factor of 100, requires thirteen neutral density filters and sections 46–50 require no neutral density filters. The light transmission factors in the table were determined experimentally and are rounded off to multiples of five.

Figure 4:
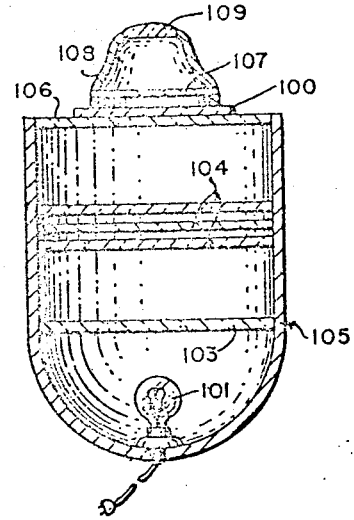
Fig. 4 is a sectional view of a light housing with which the invention of Figs. 1-3 is adapted to be used.

Referring now to Fig. 4, the multiple color plate of either Fig. 1 or 2 is shown mounted on cover plate 106 of a standard light housing 105. The light source 101 illuminates the multiple color plate 100 through a heat absorbing glass 103 and ground glass diffusion plates 104 in a conventional manner. The transparency 107 may be placed in a convenient holder and viewed through a conventional magnifying device 109. In operation, the holder is moved across the various filter sections until the desired correction is obtained.

In setting up this housing, the lighting may not be equally diffused on all sections of the color plate due to the point source nature of the light. As a result, the filter sections at the outer edges of the multiple color plate may be illuminated by less light than the center sections. This condition which may be indicated by a photo cell may therefore cause the neutral density filter corrections as set forth in the table to be inaccurate. A proper correction may be obtained by adding additional neutral density filters in the central areas until the light transmission factor of each compensated filter section is equal.

Figure 5:
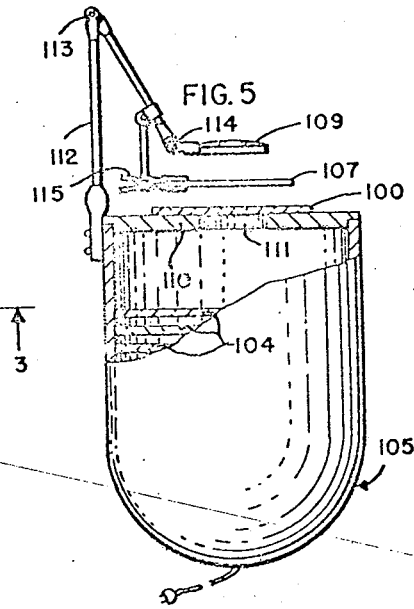
Fig. 5 is a partial sectional view of a modification of the light housing of Fig. 4 which has a covering plate of non-transparent material having a small aperture over which the color plate is illuminated.

Fig. 5 is similar to Fig. 4 except the multiple color plate 100 is slidably mounted on a cover plate 110 which may be made of wood, metal or any other desired material. In the center of the cover plate 110, there is an aperture 111 which provides illumination to a limited portion of the multiple color plate. The bracket 112 may be attached to the housing 105 and may include universal type joints 113 and 114 whereby the magnifying device 109 and clip 115 for rigidly clamping the transparency to this support may be adjustably mounted with respect to aperture 111 and the multiple color plate. The transparency 107 may be viewed through a magnifying device 109 and the effect of the various filter sections on the transparency 107 may be observed by sliding the color plate 100 over cover plate 110. This arrangement permits movement of the multiple color plate in lieu of continuous touching and moving the transparency by hand.

One advantage obtained by this arrangement is that only part of the multiple color plate is illuminated at any time thereby making it easier to provide equal illumination over the illuminated area. This eliminates the problem discussed in connection with Fig. 4 concerning the provision of equal illumination over all sections. This embodiment also provides the advantage of shielding the filter sections not in use from the intense heat of light source 101 which may cause curling of the filters if gelatin filters are used.

The size of aperture 111 is preferably chosen to be approximately the size of the transparency and three to eight times as large as each filter section whereby the effect on the transparency of several adjacent sections of the filter may be viewed simultaneously.

The embodiments described above should not be construed as limiting the concepts of the invention, but only as illustrative of those concepts. Many modifications within the scope of the invention will readily appear to those skilled in the art. The invention is especially useful in producing color prints, such as Ansco Printon, from transparencies such as Ansco Color, Ektachrome, or Kodacrome, but is not restricted to such use. It may be employed wherever colorimetric determinations are made.

The invention described herein may be made or used by or for the United States Government without the payment to me of any royalty thereon.

I claim:

1. A constant density multiple color plate comprising a plurality of sections varying in color and color saturation, said sections being arranged in a pattern providing radiating columns or color with the color saturation of said columns varying progressively from the outer portions of said plate to the inner portions thereof, the neutral density of said sections varying with the color saturation, and neutral density filters added to sections having less color saturation so that the amount of light passing through each of said sections will be substantially equal when each section is equally illuminated.

2. A constant density multiple color plate comprising a light transmissive disk having sections of different color and color saturation arranged in concentric circles about the center of said disk, the color varying circumferentially and the saturation varying radially in a pattern providing radiating columns of color with the heaviest color saturation at the outer edge of said disk and progressively lighter colors toward the center thereof, the neutral density of said sections varying with the color saturation, and a plurality of neutral density filters superimposed on selected sections the number of filters varying inversely as the saturation varies so that an equal amount of light will be transmitted by each of said sections.

3. A constant density multiple color plate comprising a light transmissive member having a plurality of sections, adjacent sections having different colors and color saturations, said sections being arranged in a pattern, providing radiating columns of color with the heaviest color saturation sections on outer portions of said member and progressively lighter colored sections at centrally located portions, the neutral density of said sections varying with the color saturation, and a plurality of neutral density filters superimposed on said lighter colored sections the number of filters superimposed on any one of said lighter colored sections varying inversely as the color saturation of said section so that an equal amount of light will be transmitted by each of said sections.

4. A visual aid for determining accurate color correction of a color transparency comprising a light source, a light transmissive member having a plurality of light filter sections of different colors and color saturations, said sections being arranged in a pattern providing radiating columns of color with the color saturation of said columns varying progressively from the outer portions of said member to the inner portions thereof, the neutral density of said sections varying with the color saturation, neutral density filters superimposed on the lighter colored sections, the number of neutral density filters superimposed on any one of said sections varying inversely as the color saturation of said sections, and means for illuminating said filter sections by said light source so that the effect of each of said filter sections on a color transparency may be viewed.

5. A visual aid for determining accurate color correction of a color transparency which comprises a light transparent support for holding said color transparency over a lighted background whereby the transparency may be viewed, said lighted background including a series of areas having a plurality of colors and color saturations, said areas being arranged in a pattern providing radiating columns of color with the color saturation of said columns varying progressively from the outer portions of said background to the inner portions, thereof, the neutral density of said areas varying with the color saturation, neutral density filters superimposed on the lighter colored areas, the number of neutral density filters superimposed on any one of said areas varying inversely as the color saturation of said area so that the intensity of the light transmitted by each of said areas is equal and constant when measured by a photocell.

6. A visual aid for determining a filter necessary to correct for the off-color appearance of a color transparency which comprises a housing having a plurality of sides, one of said sides having an aperture therein, said aperture being substantially the size of said transparency, a light source associated with said housing so that said aperture is illuminated to provide a lighted background over which said color transparency may be viewed, said lighted background being composed of a series of areas varying in color and color saturation said areas being arranged in a pattern providing radiating columns of color with the color saturation of said columns varying progressively from the outer portions of said background to the inner portions thereof, the neutral density of said areas varying with the color saturation, and neutral density filters superimposed on the lighter colored areas, the number of neutral density filters superimposed on any one of said areas varying inversely as the color saturation of said area.

References Cited in the file of this patent

UNITED STATES PATENTS

| | | |
|---|---|---|
| 696,860 | Dawson | Apr. 1, 1902 |
| 862,336 | Kallab | Aug. 6, 1907 |
| 1,480,486 | Allen | Jan. 8, 1924 |
| 1,878,857 | Kitroser | Sept. 20, 1932 |
| 1,971,737 | Troland | Aug. 28, 1934 |
| 2,063,222 | Beau | Dec. 8, 1936 |

FOREIGN PATENTS

| | | |
|---|---|---|
| 5,356 | Great Britain | of 1901 |